March 12, 1935. J. S. MORGAN, JR 1,993,796
WEIGHT INDICATING ROTARY SWIVEL
Filed March 28, 1931  2 Sheets-Sheet 1
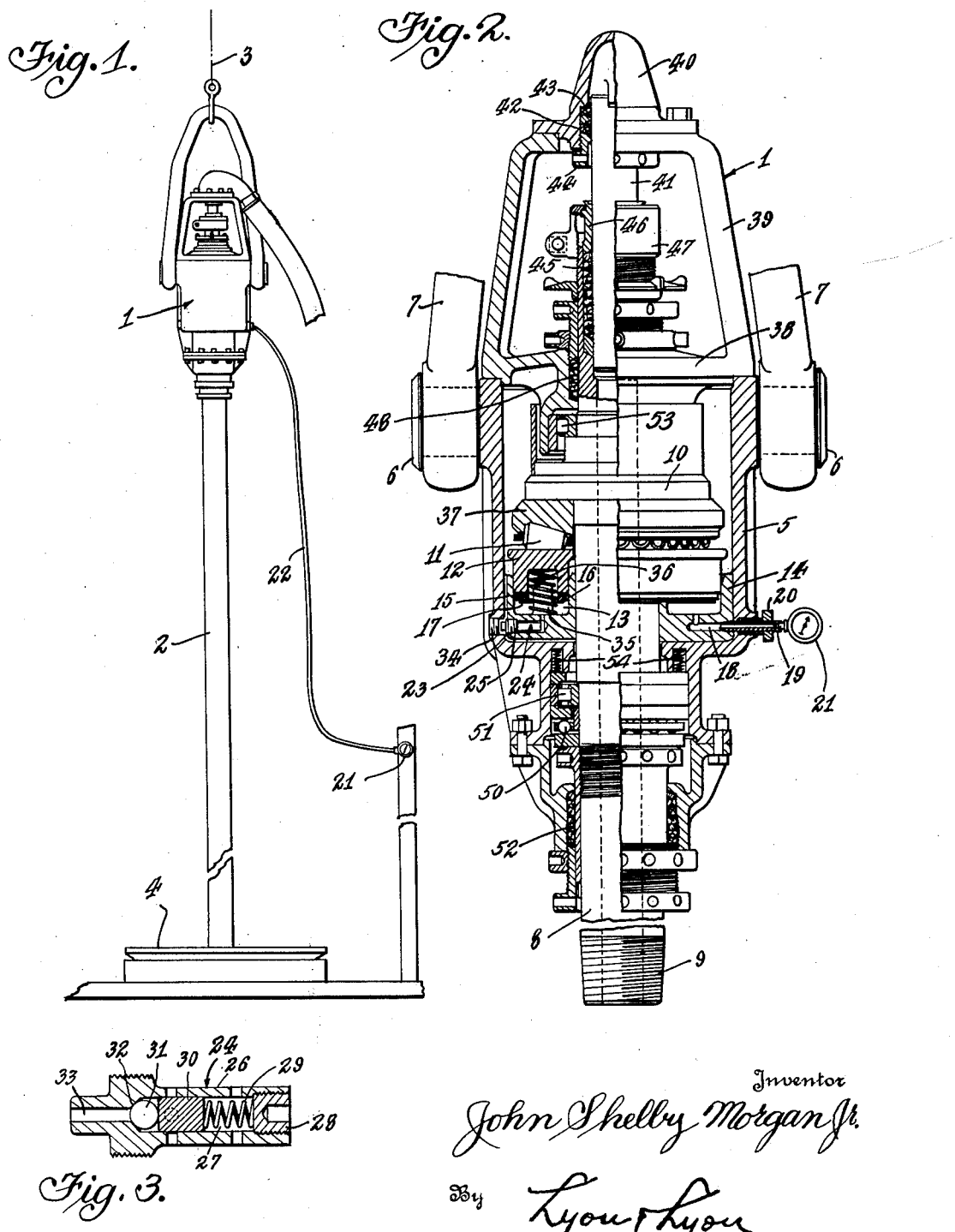
Inventor
John Shelby Morgan Jr.
By Lyon & Lyon
Attorney March 12, 1935.  J. S. MORGAN, JR  1,993,796
WEIGHT INDICATING ROTARY SWIVEL
Filed March 28, 1931  2 Sheets-Sheet 2

Inventor
John Shelby Morgan Jr.
By Lyon & Lyon
Attorneys

UNITED STATES PATENT OFFICE 1,993,796

WEIGHT INDICATING ROTARY SWIVEL

John Shelby Morgan, Jr., Inglewood, Calif., assignor, by mesne assignments, to The National Superior Company, Toledo, Ohio, a corporation of Delaware Application March 28, 1931, Serial No. 526,048

6 Claims. (Cl. 265—47)

This invention relates to weight indicating rotary swivels, and particularly to a combined weight indicating means and hydraulic swivel for connecting the hollow drill stem used in the rotary process of drilling wells with a source of fluid under pressure providing a rotatable coupling for the drill stem during the process of drilling a well with a non-rotated well drilling fluid conduit, and in which structure the rotating swivel is supported on bearings cushioned on a fluid in a manner to permit the connecting of a gauge with the fluid supporting the bearing so that the weight imposed on the swivel bearing by the rotary drill stem may be indicated by such gauge.

An object of this invention is to provide a combination rotary hydraulic swivel and weight indicating device so constructed that the load imposed on the swivel by the rotary drill stem may be measured and indicated.

Another object of this invention is to provide a rotary hydraulic swivel with a weight indicating means in which bearings of the swivel are supported on a race, which race is positioned in a chamber of confined fluid so that the weight imposed by the drill stem may be converted into fluid pressure which may be recorded or indicated by a simple gauge.

Other objects and advantages of this invention it is believed will be apparent from the following detailed description of a preferred embodiment thereof as illustrated in the accompanying drawings.

In the drawings:

Figure 1 is a side elevation of a rotary swivel and weight indicating device embodying my invention.

Figure 2 is an enlarged elevation mainly in vertical mid-section thereof.

Figure 3 is a sectional view of the refilling means provided in my invention.

Figure 4:
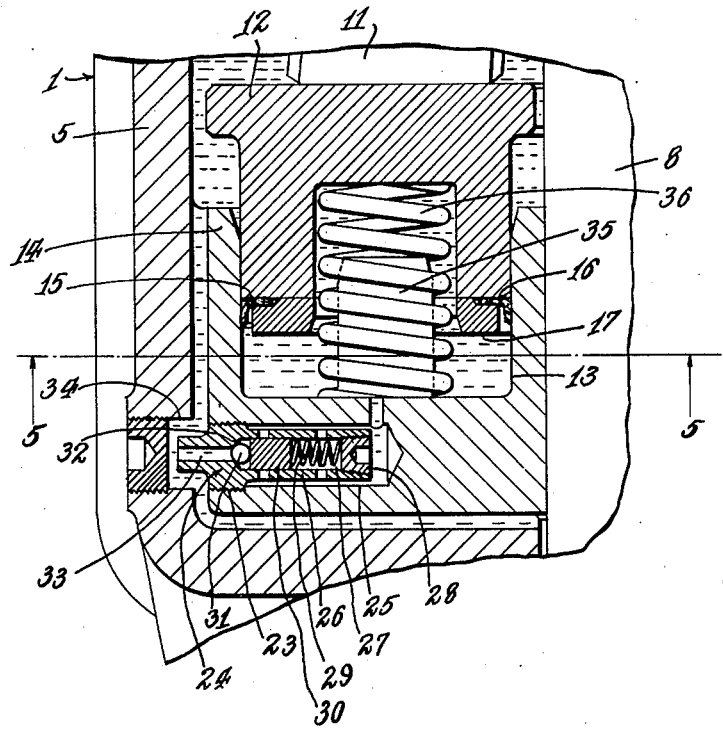
Figure 4 is an enlarged fragmental sectional view of the cylinder chamber and bearing race ring indicating the automatic refilling means embodied in my invention as connected therewith.
Figure 5:
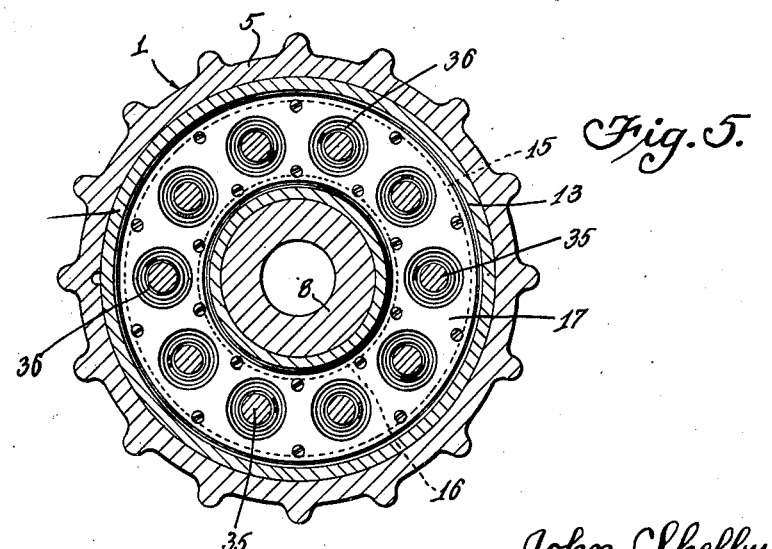
Figure 5 is an end sectional view taken substantially on line 5—5 of Figure 4.

In the accompanying drawings I have illustrated my combined swivel and weight indicating means at 1 as connected to the drill stem 2 and supported by the cable 3. The drill stem 2 is adapted to be rotated by a rotary machine indicated at 4.

In order that the operator of the rotary drilling apparatus may regulate the weight imposed upon the bit secured to the lower end of the drill stem 2 as the drill stem 2 is rotated by the rotary machine 4 by reeling in or letting out the cable 3, it is desirable to have a means for indicating the weight of the drill stem 2 imposed on the supporting bearings of the swivel 1.

In order to accomplish this object, I form my swivel and weight indicating means preferably as follows:

The swivel 1 formed with a body 5 having diametrically opposed trunnions 6 adapted to fit within eyes formed within the ends of the bail 7. The bail 7 is connected with the supporting cable 3. Mounted axially within the body 5 is a rotary stem 8 which is threaded as indicated at 9 to the upper end of the drill stem 2. The rotary stem 8 is provided at a point between its ends with a head 10 which is rotatably supported on roller bearings 11 mounted upon a bearing race ring 12. The bearing race ring 12 is yieldably mounted in a closed chamber 13 formed by a chamber ring 14 mounted within the body 5. The race ring 12 on its inner and outer peripheries fits closely within the chamber ring 14, and packing rings 15 and 16 are secured to the lower end of the ring 12 by means of a ring follower 17 secured to the lower end of the race ring 12. Packing rings 15 and 16 expand outwardly to pack the ring 12 within the chamber ring 14 to form a fluid-tight connection. The chamber 13 is filled with a fluid such, for example, as oil, and a port 18 leading from the chamber 13 through the chamber ring 14 and body 5 is provided.

A connecting nipple 19 is threaded into the port 18, and a packing gland 20 is provided for forming a fluid-tight connection between the nipple 19 and the body 5. The end of the nipple 19 may be connected directly to a gauge 21, as indicated in Figure 2, or may be connected through a flexible hose 22, as indicated in Figure 1, which flexible hose 22 leads to the gauge 21 positioned upon a post or other support in the derrick close to the operator of the rotary drilling apparatus.

The gauge 21 is calibrated to indicate tons of weight of the drill stem 2 as imposed upon the bearings 11 of the swivel.

The ring 14 surrounds the rotary stem 8 within the body 5, but is loosely fitted to the stem 8.

In order to provide for the filling of the chamber 13 with a fluid, a filling port 23 is formed in the ring 14, and a filling fitting 24 is threaded into a receiving chamber 25 formed in communication with the port 23. The filling fitting 24 includes a body 26 which is provided with a longitudinal bore 27 in which a plug 28 is threaded to engage one end of the spring 29. The spring 29 at its opposite end engages a sleeve 30, which sleeve 30 is yieldably urged in position to seat a ball 31 on a seat 32.

A bore of reduced diameter, as indicated at 33, extends through the end of the body 26. Adjacent the chamber 25 formed in the ring 14 is a threaded port 34 permitting draining of the body 5 of the lubricant positioned therein for lubricating the bearings 11 and the other bearings in the swivel, and also permitting access to the fitting 24 for the purpose of filling the chamber 13.

The fitting 24 also provides an automatic means for filling the chamber 13 with the oil from within the body 5 of the swivel when the swivel is landed by the bit carried by the end of the drill stem 2 being landed on the bottom of the hole to take the load off from the main bearings 11 of the swivel.

In order to accomplish this object, trunnions 35 are provided along the lower surface of the ring 14, and springs 36 are mounted on the trunnions 35 and engage at their upper ends the race ring 12 to normally urge the race ring 12 upwardly. The automatic filling of the chamber 13 with the oil from within the body 5 in order to compensate for any leakage, is accomplished by the formation of a partial vacuum within the chamber 13 when the load is released from off the bearings 11 and the upward movement of the ring 12 caused by the springs 36 when the load is thus relieved.

The partial vacuum acts on the piston thus causing the ball 31 to move from its seat 32, permitting an inrush of oil through the fitting 24 into the chamber 13. Reverse movement of the oil is prevented by the valve 31.

Interposed between the head 10 and the bearings 11 is an upper race ring 37. Secured to the body 5 is a cap 38 which is provided with an axial passage through which the upper portion of the rotary stem 8 projects. The cap 38 is provided with a bridge 39 to which a flanged goose-neck 40 is secured. The conduit employed for conducting the drilling fluid under pressure to the swivel is screw-threaded to the goose-neck 40. A wash pipe 41 is secured within the goose-neck 40 and provides a means for establishing communication between the goose-neck 40 and the rotary stem 8. The wash pipe 41 is fitted within the rotary stem 8 and is aligned with relation to the goose-neck 40 by means of packing 42 surrounding the upper portion of the wash pipe 41 and seated on a conical seat 43 formed within the goose-neck 40.

A packing follower ring 44 is threaded into the lower end of the goose-neck 40 in position to engage the packing 42 to adjust the same within the goose-neck 40.

A packing recess 45 is formed within the upper end of the rotary stem 8 around the wash pipe 41, and packing is mounted in this recess. This packing is provided for connecting the stationary wash pipe 41 in fluid-tight relation with the rotating stem 8 of the swivel.

The packing is compressed within the recess 45 by means of a follower 46 in position to engage the packing within the recess 45. A packing gland follower nut 47 is threaded to the upper end of the rotary stem 8 to engage the follower 46 to compress the packing within the recess 45. A packing gland 48 is provided for packing the cover 38 with relation to the rotary stem 8.

The lower end of the body is provided with upthrust bearings 50 and radial bearings 51 and is packed with relation to the rotary stem 8 as indicated at 52.

In order to provide for the axial movement of the rotary stem 8 relative to the body 5 which is incident to the movement of the lower race ring 12 due to leakage or compression of the fluid in the chamber 13, there is provided spaced radial bearings 51 and 53 that permit a limited axial movement of the stem. The component parts of the up-thrust bearing assembly 50 are maintained in their fixed relative arrangement by means of a plurality of compression springs 54 mounted within recesses in the body 5. The springs 54 prevent any lost motion between the balls and plates and cushion the impact of any quickly applied up-thrust load on the bearing 50.

While I have herein specifically set forth the construction of the swivel as illustrated, it is to be understood that my invention is not of necessity limited thereto, but is applicable to many forms of rotary hydraulic swivels.

Having fully described my invention, it is to be understood that I do not wish to be limited to the details herein set forth, but my invention is of the full scope of the appended claims.

I claim:

1. In a combined rotary swivel and weight indicating means, the combination of a body, means providing a chamber within the body, a rotary stem, means for rotatably supporting the stem above said chamber, an enclosure coextensive with the body, means within said enclosure and body for rotatably supporting the stem, said supporting means including means acting as a plunger in said chamber to transmit the weight of the rotary stem to a fluid in the chamber, and an indicating means operably connected with the said chamber to indicate the pressure of the fluid therein.

2. In a combined rotary swivel and weight indicating device, the combination of a body, including means defining a confined chamber within the body, a rotary stem, means for rotatably supporting the stem above said confined chamber, an enclosure coextensive with the body, means within said enclosure and body for rotatably supporting the stem, said supporting means including means acting as a plunger in said confined chamber to transmit the weight of the rotary stem to the fluid in said chamber, and means interposed between the latter said means and the body for holding the lower race ring and body from relative rotation, and an indicating means operatively connected with said chamber to indicate the pressure of the fluid therein.

3. In a combined rotary swivel and weight indicating device, the combination of a housing assembly, a rotary stem, downthrust bearing means for rotatably supporting the stem within said housing, means defining an annular fluid chamber between the downthrust bearing means and said housing, indicating means operatively connected with said chamber to indicate the pressure of the fluid therein due to the applied axial load on said rotary stem, radial bearing means mounted in said housing to axially align said rotary stem and permit relative axial movement between the housing and stem, upthrust bearing means interposed between the rotary stem and said housing, yieldable means interposed between the upthrust bearing means and said housing to maintain the relative axial arrangement of the parts in the upthrust bearing means upon any relative axial movement of the rotary stem and housing due to the compression or leakage of the fluid in the fluid chamber.

4. In a combined rotary swivel and weight indicating device, the combination of a body having an upper chamber and a lower chamber, a rotary stem, means cooperating with the stem and the lower end of the body to completely close the lower end of the lower chamber, a cover secured to said body and surrounding the stem to enclose the upper chamber to define a lubricant enclosure, means including a main bearing mounted within the upper chamber for rotatably supporting the stem, a radial bearing for the stem supported above the main bearing, a radial bearing for the stem in the lower chamber, an upthrust bearing mounted within the lower chamber, means on the stem to support the upthrust bearing, means defining a confined fluid chamber within the body, said supporting means for the stem including means acting as a plunger in said confined chamber to transmit the weight imposed on the rotary stem to the fluid in said chamber, and indicating means operably connected with the fluid in the chamber to indicate the pressure of said fluid.

5. In a combined rotary swivel and weight indicating device, the combination of a body, a rotary stem, means defining a confined fluid chamber within the body, means including a thrust bearing for rotatably supporting the stem within the body, means including said body for defining an enclosed lubricant chamber for said thrust bearing, a lubricant fluid in the chamber, the supporting means including means acting as a plunger in said confined chamber to transmit the weight imposed on the rotary stem to the fluid in the chamber, and automatic valve means connecting the lubricant chamber and the confined fluid chamber for automatically admitting and replenishing the fluid in the confined chamber when the load is relieved from the rotary stem.

6. In a combined rotary swivel and weight indicating device, the combination of a body, a rotary stem, means defining a confined fluid chamber within the body, means including a thrust bearing for rotatably supporting the stem within the body, means including said body for defining an enclosed lubricant chamber for said thrust bearing, a lubricant fluid in said chambers, said supporting means including means acting as a plunger in said confined chamber to transmit the weight imposed on the rotary stem to the fluid in said chamber, spring means operative to lift the bearing supporting means, and automatic valve means connecting the lubricant chamber and the confined fluid chamber for automatically admitting and replenishing the fluid in the confined chamber when the spring means acts to lift the bearing supporting means upon the load being relieved from the rotary stem.

JOHN SHELBY MORGAN, Jr.